Figure 1:
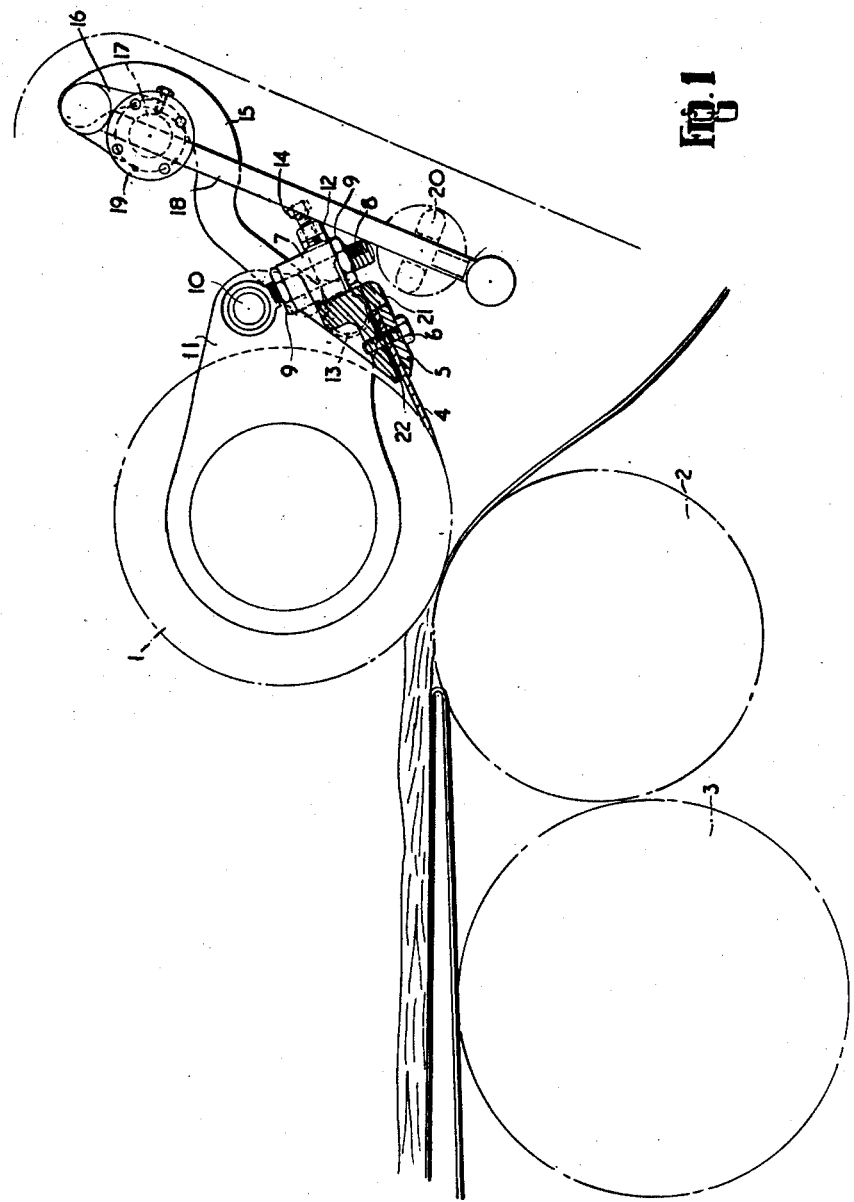

May 13, 1952

E. M. CROSLAND 2,596,215

ROLLER MACHINE FOR THE MOLDING OF DOUGH
AND OTHER PLASTIC SUBSTANCES

Filed Feb. 13, 1948

3 Sheets-Sheet 1

Inventor,
Edward Milner Crosland

By
S. Victor Armstrong
Attorney

May 13, 1952

E. M. CROSLAND 2,596,215

ROLLER MACHINE FOR THE MOLDING OF DOUGH
AND OTHER PLASTIC SUBSTANCES

Filed Feb. 13, 1948

3 Sheets-Sheet 2

Inventor,
Edward Milner Crosland,

By
S. Victor Armstrong
Attorney

May 13, 1952 E. M. CROSLAND 2,596,215
ROLLER MACHINE FOR THE MOLDING OF DOUGH
AND OTHER PLASTIC SUBSTANCES
Filed Feb. 13, 1948 3 Sheets-Sheet 3

Edward Milner Crosland Inventor,

By
J. Victor Armstrong
Attorney

Patented May 13, 1952

2,596,215

UNITED STATES PATENT OFFICE 2,596,215

ROLLER MACHINE FOR THE MOLDING OF DOUGH AND OTHER PLASTIC SUBSTANCES

Edward Milner Crosland, Culcheth, near Warrington, England, assignor to T. & T. Vicars Limited, Earlestown, Newton-le-Willows, England Application February 13, 1948, Serial No. 8,229
In Great Britain December 22, 1945

Section 1, Public Law 690, August 8, 1946
Patent expires December 22, 1965

3 Claims. (Cl. 107—12)

The present invention relates to improvements in machines for the moulding of plastic substances such as are, for instance, used in the manufacture of sheets or webs of dough for the making of biscuits, taken by way of example.

The invention is applicable to gauging machines of the type in which a pair of rollers on horizontal axes are disposed one substantially vertically above the other to roll out and to gauge dough webs or sheets to a predetermined thickness.

The invention is further applicable to machines of the type where three or more rollers are disposed to form a sheet from a mass of dough fed into a hopper above a pair of such rollers.

If the machine is working on already prepared sheets of dough, then the preformed surface on the dough sheet will allow the dough sheet to leave the roller surface after passing through the rollers and being gauged to thickness. The scraper in this case is applied to the roller surface a distance away from the bight of the rollers, the purpose of the scraper being to clean the roller, to prevent grease from accumulating on the surface, and to keep the surface in a desirable, operational condition.

If, however, the rollers are being used on dough that has not already been formed into a sheet, that is if they are functioning as a sheeter, then the dough will adhere to both rollers and if the sheet being formed is not to be broken it must be positively detached from one (preferably the top) roller as soon as it is released from the bight of the rollers, and a scraper must be in a position to operate almost within the bight.

It will be appreciated that where a top gauging roller is being used in conjunction with one or more rollers for either re-rolling a preformed sheet, or for making a sheet directly from dough as received from a mixer, it is desirable for the scraper to occupy either of two positions around the periphery of the roller.

An object of the present invention is to provide means whereby a scraper can be displaced rapidly from a higher position to a lower position almost within the bight in such cases where the surface of the sheet is sticky, and tends to adhere to the top roller.

It will also be appreciated that a scraper to function properly must be carried in the correct tangential position relative to the roller surface, and that this position must not be altered even if the scraper is moved radially around the roller.

If the scraper has been in action for some time there may be slight accumulations of grease or oil that will interfere with the intimate contact of the scraper edge and the roller surface, and it is desirable that periodically the scraper edge may be cleaned.

According to the present invention a scraper blade is mounted to be rotatable about the axis of a roll whilst maintaining a set position tangentially to said roll, and further, may be rotatable about a pivot displaced from the centre of the roll so that the blade can be swung away from the roll without disturbing its adjustment, for cleaning purposes.

Adjustable stop means may be provided to set the blade to the desired tangential position relatively to the roll, this adjustment allowing for the edge of the scraper to be brought into the desired tightness of engagement with the roll to compensate for wear.

Figure 2:
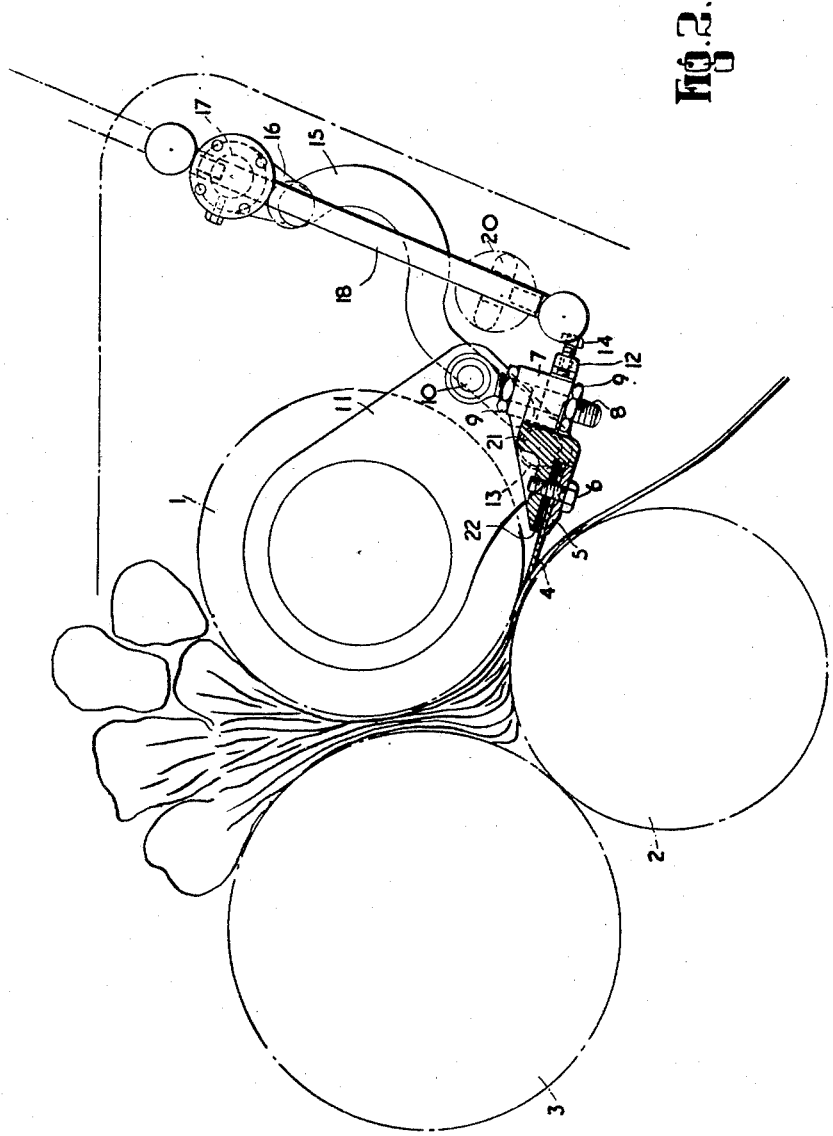
Figure 3:
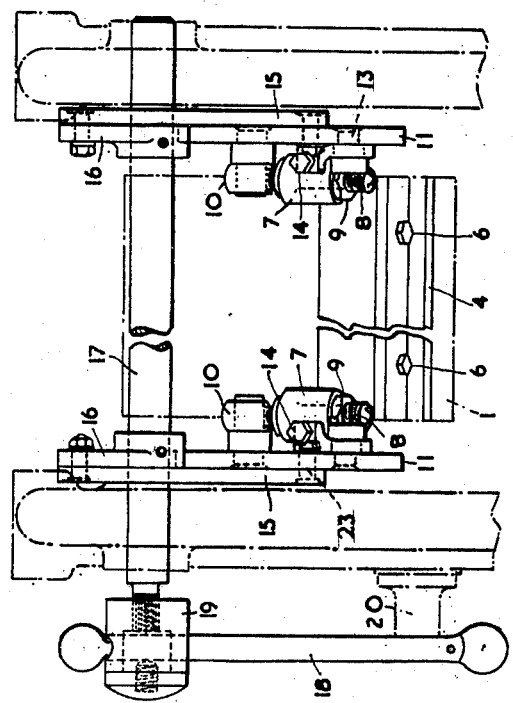

The invention is further described with reference to the accompanying drawings, in which:

Figure 1 is a sectional elevational showing the application of an adjustable scraper to a roll arrangement when used for gauging a sheet of dough, Figure 2 is a corresponding view of the same machine when the dough is being sheeted and gauged, Figure 3 is an end elevation of the machine with the parts in the position of Figure 1.

The gauging and sheeting mechanism is shown diagrammatically, consisting of a top gauging roller 1 and a bottom gauging roller 2 the axes of which are displaceable relatively to one another by an adjustment means of any known form to adjust the final thickness of the dough sheet as required. 3 indicates a compression roll which is displaceable from the position shown in Figure 1, where it is out of use, to the position shown in Figure 2, where it is acting as a compression roller.

In Figure 1 the scraper 4 is shown in contact with the roller 1 to keep this roller clean, whilst in Figure 2 the scraper 4 serves to detach the dough from the roller surface in addition to keeping the roller clean.

The scraper blade 4 is held in the scraper holder 21 by means of the clamping plate 5 and screws 6. An elastic or semi-elastic pad or lamina 22 is interposed between the scraper blade 4 and the base of its holder.

The holder 21 has a boss 7 at either end, the boss being bored to enable it to slide over adjusting screws 8. Lock nuts 9 are used to adjust the scraper with the holder nearer to, or further away from, the roller surface.

The adjusting screws 8 have eyes at one end made to go over pins 10 fixed into carrier plates 11. The scraper and holder unless locked in position can be oscillated about pins 10. A locking bracket 12 is arranged to swivel about pin 13 fixed in each plate 11. If the screw 14 in each locking bracket 12 is used to lock the ends of the scraper holder, then the scraper and its holder are held rigidly in position, but if the screws 14 are slackened and the locking brackets swivelled out of the way, then without disturbing the alignment of the scraper to the roller the scraper edge may be moved away in an arc from the roller surface, so that the scraper edge may be cleaned.

Carrier plates 11 are mounted on and coaxial with trunnions of the roller 1 so that with any adjustment of the roller the intimate contact of the scraper edge and the roller surface will be maintained.

Similarly, plates 11 can be moved around the axis of the roller without disturbing the tangential setting of the scraper on the roller.

The position of plates 11 and the scraper edge relative to the bight of the rollers 1 and 2 can be regulated by means of levers 15 attached by pins 23 to plates 11 and to cranks 16, the crank arms being mounted on an oscillatable shaft 17. The shaft 17 stretches across the machine and has the cranks at either side so that the movement of shaft 17 lifts or lowers both plates 11 simultaneously on either side of the machine.

A partial rotation of the crank shaft 17 can be quickly made by moving the operating handle 18. This handle is slidable in a slotted boss 19 attached to the end of shaft 17. After being moved round approximately 180° the handle may be pushed into its lower position when it may be held between two hinged lugs 20 to locate and hold plates 11 and the scraper in a definite position.

With this arrangement the lugs 20 can be swung to release the handle 18 which can then quickly be moved through 180° and the position of the scraper moved from the lower to the higher, or from the higher to the lower, almost simultaneously.

It will be seen that the handle 18 can displace the crank arm 15 into two dead centre positions, one being a normal operating position where the blade is disposed away from the bight of the rollers, as in Figure 1, whilst the other position is the one in which the blade is disposed within the bight of the rollers, as shown in Figure 2.

I declare that what I claim is:

1. A machine for moulding plastic substances including in combination a pair of spaced rolls, a carrier rotatable about the axis of one of the rolls, a scraper blade, a mounting for said blade, a pivot carrying said mounting on said carrier and allowing free angular movement of said mounting thereon, means to lock said mounting on said carrier with the blade in its operative position, an operating handle, and a toggle link connection between said operating handle and said scraper blade carrier.

2. A machine for moulding plastic substances including in combination a pair of spaced rolls, a carrier rotatable about the axis of one of the rolls, a scraper blade, a mounting for said blade, a pivot carrying said mounting on said carrier and allowing free angular movement of said mounting thereon, means to lock said mounting on said carrier with the blade in its operative position, and means to adjust said mounting relatively to said pivot.

3. A machine for moulding plastic substances including in combination a pair of spaced rolls, a carrier rotatable about the axis of one of the rolls, a scraper blade, a mounting for said blade, a pivot carrying said mounting on said carrier and allowing free angular movement of said mounting thereon, means to lock said mounting on said carrier with the blade in its operative position, a second pivot on said carrier, a fixed pivot, a crank arm rotatable about said fixed pivot, a link connecting said crank arm and said pivot on said carrier, a diametrically perforated boss on said fixed pivot, and a tommy bar operating handle sliding through said perforated boss.

EDWARD MILNER CROSLAND.

REFERENCES CITED

The following references are of record in the file of this patent:

UNITED STATES PATENTS

| Number | Name | Date |
| --- | --- | --- |
| 980,454 | Thomson | Jan. 3, 1911 |
| 1,162,291 | Kraut | Nov. 30, 1915 |
| 1,255,245 | Taylor | Feb. 5, 1918 |
| 1,319,080 | Hottmann | Oct. 21, 1919 |
| 1,595,019 | Moores | Aug. 3, 1926 |
| 2,125,859 | Liebelt | Aug. 2, 1938 |
| 2,145,550 | Loose | Jan. 31, 1939 |
| 2,159,044 | Paterson | May 23, 1939 |